United States Patent [19]

Comroe et al.

[11] Patent Number: 4,817,190

[45] Date of Patent: Mar. 28, 1989

[54] METHOD FOR DYNAMICALLY REGROUPING SUBSCRIBERS ON A COMMUNICATIONS SYSTEM

[75] Inventors: Richard A. Comroe, Dundee; John E. Major, Inverness; Daniel J. Coombes, Winfield; Susan M. Whitney, Barrington; Michael D. Sasuta, Palatine; Kenneth J. Zdunek, Schaumburg; Gerald E. Pioch, Wheeling, all of Ill.; Jaime A. Borras, Hialeah; Ronald L. Scheiderer, Davie, both of Fla.; Susan M. Blackston, Inverness, Ill.

[73] Assignee: Motorola, Inc., Schaumburg, Ill.

[21] Appl. No.: 770,037

[22] Filed: Aug. 27, 1985

[51] Int. Cl.$^4$ .......................... H04B 7/15; H04B 7/14
[52] U.S. Cl. ........................ 455/11; 455/17; 455/56; 340/825.52; 379/63
[58] Field of Search ................ 455/11, 17, 5, 49, 53, 455/54, 56, 58, 61; 370/11; 179/2 EA, 2 EB, 2 DP; 340/825.07, 825.50, 825.52, 825.47; 379/58-60, 63

[56] References Cited

U.S. PATENT DOCUMENTS

| | | |
|---|---|---|
| 4,012,597 | 3/1977 | Lynk, Jr. et al. . |
| 4,152,647 | 5/1979 | Gladden et al. . |
| 4,369,443 | 1/1983 | Giallanza et al. ............... 340/825.47 |
| 4,383,257 | 5/1983 | Giallanza et al. ............... 340/825.47 |
| 4,398,063 | 8/1983 | Hass et al. ............................. 370/95 |
| 4,414,661 | 11/1983 | Karlstrom ............................. 370/95 |
| 4,422,071 | 12/1983 | deGraaf . |
| 4,427,980 | 1/1984 | Fennell et al. ................. 340/825.52 |
| 4,517,561 | 5/1985 | Burke et al. ................... 340/825.07 |
| 4,525,865 | 6/1985 | Mears ................................... 455/151 |
| 4,553,262 | 11/1985 | Coe . |
| 4,593,155 | 6/1986 | Hawkins ................................ 455/89 |
| 4,602,366 | 7/1986 | Takumi ................................ 370/85 |
| 4,612,415 | 9/1986 | Zdunek et al. ........................ 455/56 |

FOREIGN PATENT DOCUMENTS 2118340  3/1983  United Kingdom .

OTHER PUBLICATIONS

A.P.C.O., "900 MHz Trunked Communications System Functional Requirements Development" United States Dept. of Justice, Mar. 1979, Donal D. Kavanagh.
Motorola, "Advanced 800 MHz Trunked Radio Systems", Nov. 1982.

Primary Examiner—Robert L. Griffin
Assistant Examiner—Curtis Kuntz
Attorney, Agent, or Firm—Thomas G. Berry; Donald B. Southard

[57] ABSTRACT

An improved communication system is disclosed wherein at least one reprogramming station is added to a communication system. The reprogramming station is constructed and arranged to communicate with the subscriber units thereby either reprogramming or regrouping them. The subscribing units receive the reprogramming command and acknowledge individually, altering a memory means until either reprogrammed back to the original state, or to another state. In another mode, the reprogramming station transmits a regrouping command wherein two or more groups are combined to form a super group.

6 Claims, 8 Drawing Sheets

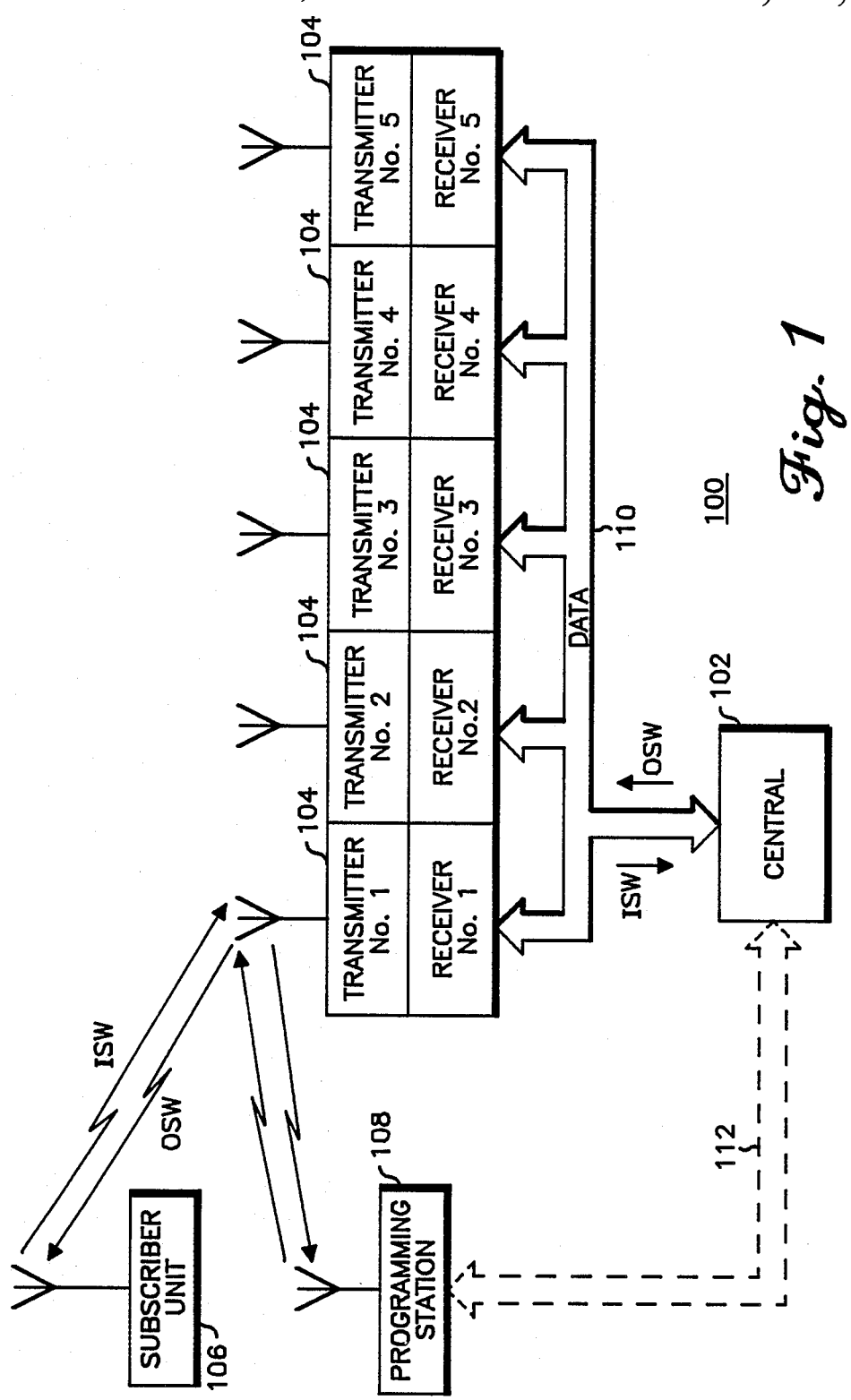

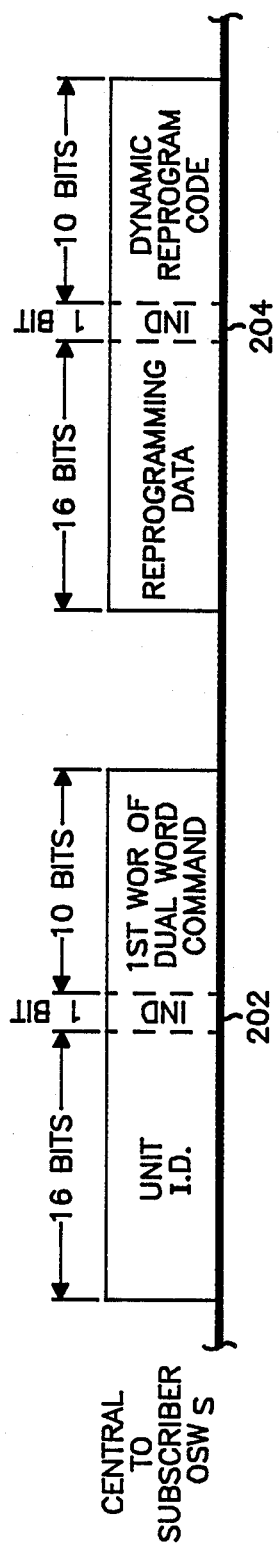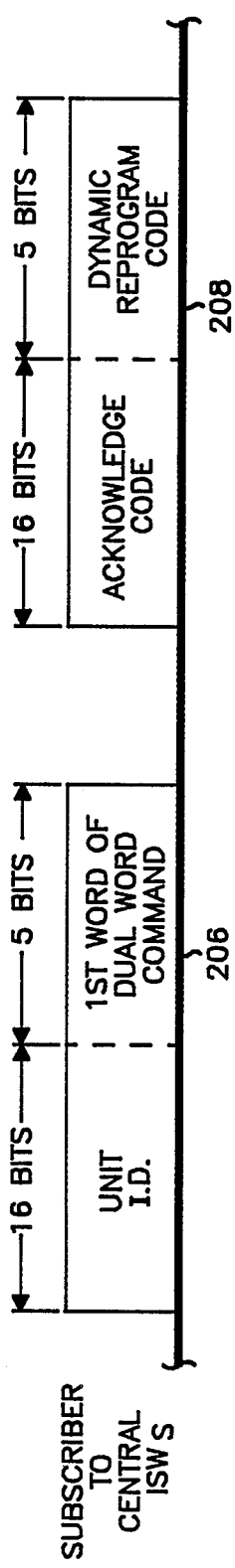

METHOD FOR DYNAMICALLY REGROUPING SUBSCRIBERS ON A COMMUNICATIONS SYSTEM

BACKGROUND OF THE INVENTION

This invention relates generally to two-way communication systems and more particularly to trunked radio systems and is more particularly directed towards a method for dynamically regrouping subscriber units.

In a basic trunked system there exists a high degree of flexibility to partition conversations between different groups so that no one agency or district is aware that another agent or district is using this system. Further, these groups can be subdivided into subgroups, so that only those people who need to communicate together on a normal basis are aware when a conversation is in progress. They need not be disturbed by the other subgroups or another agency's communications.

In prior communication systems, a subscriber unit, typically a mobile radio installed in a vehicle, was programmed at the factory to operate within one or more predetermined groups. Accordingly, the radio contained a code plug or programmable read-only memory (PROM) that specified the group, subgroup, and individual ID's enabling a subscriber unit to participate in either individual, subgroup, or group wide calls. If a subscriber unit were programmed to allow communication in more than one group, a selection mechanism, for example a selector switch, is used by the subscriber.

A typical example of such a hierarchy might be to have a group ID consist of a construction company and subgroups assigned to management personnel, delivery personnel, and various on-site teams. Of course, each subscribing unit has its own individual ID for individual calls. Thus, all of management personnel may communicate on a subgroup basis without disturbing the other personnel in the construction company. Also, a group wide call may be made to all individuals associated with a particular company. The same hierarchical analogy can be drawn in the public safety market. For example, the groups could be police and fire departments and the subgroups consisting of individual districts.

The communication system described above suffers a significant detriment in that once assigned, the group, subgroup, and individual identities cannot be changed without installing a new code plug in the radio. Typically, this is done in the field at a service center and, of course, once changed cannot be returned to the original ID without another code plug exchange. There exist, however, several situations in which it would be extremely advantageous to dynamically reassign subscriber units to different groups, or create new groups on a permanent or temporary basis. Examples of these situations include tactical operations such as forest fires, airplane crashes, and hostage situations. Also, natural disasters such as flooding, blizzards and tornadoes might be more effectively handled if the subscribing units could be dynamically rearranged to respond to natural or man made emergencies.

Another detriment of the communication system described above is that subscriber units can have selection capability regarding what group calls will be participated in. This is an advantage under normal circumstances where some users have a need to participate in any one of several groups on a normal basis. However, during emergency situations where the radio user's participation in any one particular group is required, the radio may or may not respond to calls in that group, depending on the selection made by the user. The present invention contemplates giving the dispatcher the ability to defeat the selection capability of the subscriber unit, when the subscriber unit is dynamically reprogrammed for an emergency situation, thus ensuring that the subscriber unit responds to calls in the dynamic group.

Some prior art communications systems have attempted to provide a rudimentary multigroup calling by requesting a communication channel for each group to be contacted. However, trunked communications systems operate on the fundamental principle of having few communication channels that are dynamically shared between many groups and subgroups. Accordingly, to make multigroup calls in the fashion of the prior art rapidly consumes most or all of the communication channels. Such a system inherently wastes frequency spectrum and may cause other emergency calls to be delayed while the channels are occupied.

The present invention overcomes the detriments of the prior communication systems by dynamically reprogramming or regrouping subscriber units or groups. The present invention contemplates reprogramming one or more subscriber units on an inter or intra-group basis to form a new group that ay communicate on a single channel. Once reprogrammed, an individual subscriber may remain in the new group until it is reprogrammed either to its original group or to another group. In another embodiment, entire groups can be combined to form a super group thus providing a rapid, mass restructuring of the subscriber group allocations. The dynamic group regrouping is more typically employed in an emergency situation and is typically somewhat more temporary in nature. Accordingly, provision is made to return to the normal group allocations after a predetermined time period.

Another characteristic of the present invention is that each subscriber unit may still communicate individually in addition to group communications. For example, any subscriber unit may obtain a channel for the purpose of placing a telephone interconnect call. Also, any subscriber unit may obtain a channel for a private conversation with another subscriber unit. When a subscriber unit is dynamically reprogrammed according to the present invention, it still responds to its original ID for individual calls. Thus, the subscriber unit will not miss phone calls, private calls, or "call alerts" initiated by other subscriber units which were unaware of the new dynamic reprogramming ID.

Yet another characteristic of the present invention is the dynamic reprogramming of the "fail-soft" channel. When a trunked system fails, all subscriber units may continue to operate in a mode called fail-soft. In fail-soft, each radio has a programmed channel on which it may continue communications, shared with any other subscriber units which are programmed to the same channel during fail-soft. Obviously, subscriber units which share a common "talk group" should be programmed with the same channel number for fail-soft operation. However, when the present invention dynamically assigns new IDs, the present invention also provides optional dynamic reprogramming of a new fail-soft channel. Thus, dynamically reprogrammed units may continue to communicate on the same channel as other units in the same talk group during fail-soft operation.

SUMMARY OF THE INVENTION

Accordingly, it is the object of the present invention to provide an improved communication system.

It is a further object of the present invention to provide a communication system wherein the subscribing units can be permanently reprogrammed to another group.

It is yet another object of the present invention to provide a communication system wherein two or more groups can be reassigned to form a super group for an indefinite period of time.

It is still a further object of the present invention to provide a communication system in which reprogrammed units may still communicate using prior individual ID codes.

It is yet another object of the present invention to provide a communication system in which subscriber options and default codes are dynamically reprogrammable.

Accordingly, these and other objects are achieved in the present invention providing an improved trunked communication system.

In practicing the invention, at least one reprogramming station is added to a communication system. The reprogramming station is constructed and arranged to communicate with the subscriber units thereby either reprogramming or regrouping them. The subscribing units receive the reprogramming command and acknowledge individually, altering a memory means until either reprogrammed back to the original state, or to another state. In another mode, the reprogramming station transmits a regrouping command wherein two or more groups are combined to form a super group.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

FIG. 1 is a block diagram of an improved trunked radio system according to the present invention;

FIG. 2 a-c is an illustration of the signalling format used to reprogram subscriber units;

DETAILED DESCRIPTION OF THE PREFERRED EMBODIMENT

Figure 3A:
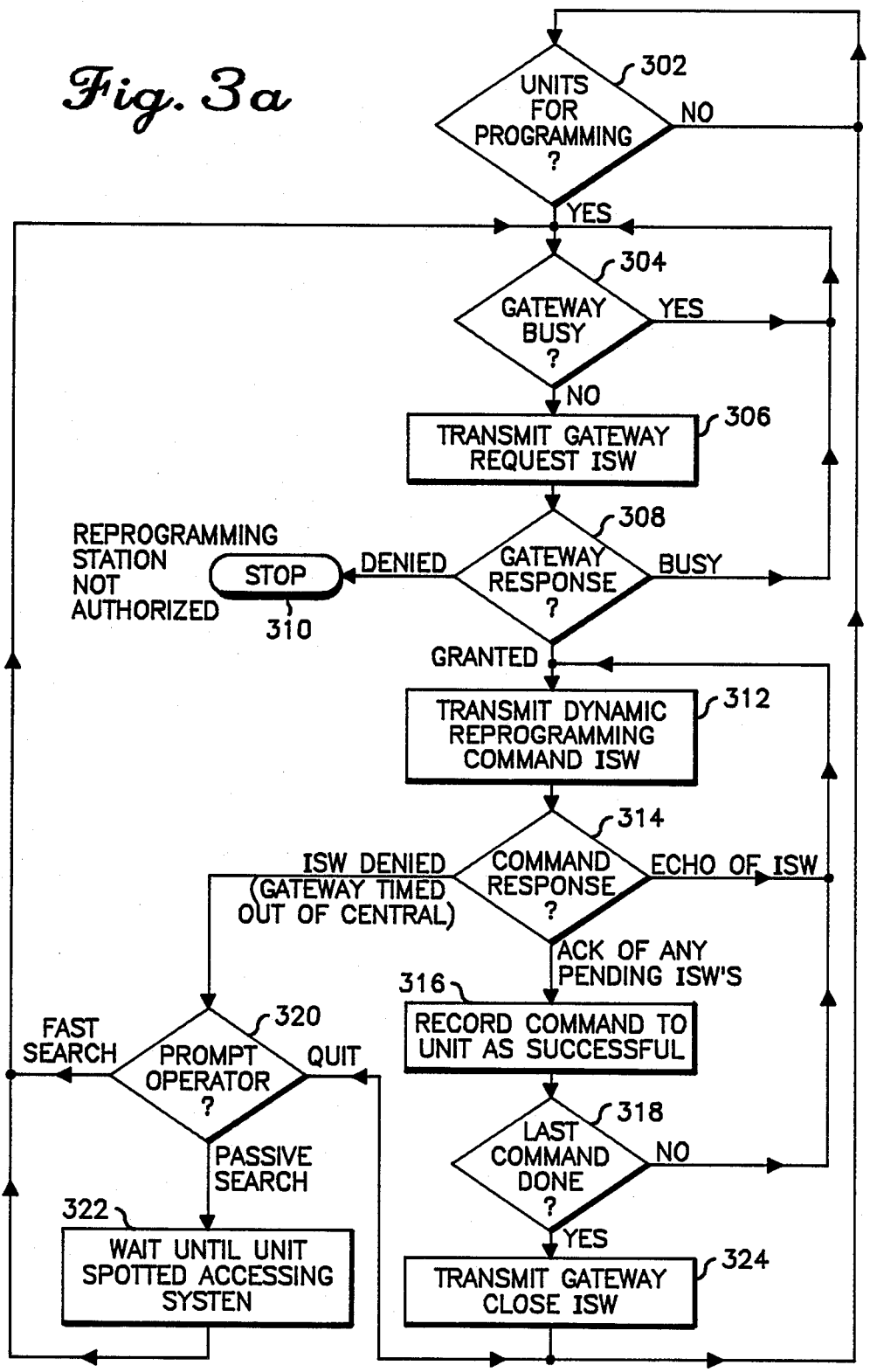
FIG. 3 a-c is a flow diagram illustrating the steps followed by the programming station and central controller of FIG. 1 to execute a dynamic reprogramming command.

Referring now to FIG. 1, there is shown an improved trunked radio communication system 100 as contemplated by the present invention. Basically, the trunked radio system 100 is comprised of a central controller 102, a plurality of trunked repeaters 104, a plurality of subscriber units 106 (one illustrated) and at least one reprogramming station 108.

To establish a trunking call between a group of units operating on the trunked system 100, a subscriber unit 106 sends a data packet called an "inbound signalling word" (ISW). The ISW contains the requesting unit's unique ID code consisting of a group ID, an individual ID, and a subgroup code indicating which group of units it desired to communicate with. The request is forwarded to the central controller 102, which decodes the request, and transmits a data packet called an "outbound signalling word" (OSW) to all subscriber units 106 which are monitoring the outbound control channel. The OSW is a channel grant which contains the subgroup code, the requesting unit's ID code, and the voice channel number assigned for the conversation. The OSW causes the requesting unit to move to the voice channel and commence transmitting and causes all subscriber units with a matching group or subgroup ID to move to the voice channel as listening units. In this way a group or subgroup call is set up. If however, all voice channels are in use when the subscriber unit 106 transmits the ISW, the central controller 102 sends the requesting subscriber unit a "busy OSW".

A typical subscriber unit which has been employed in some trunking systems is more fully shown and described in detail in Motorola Instruction Manual 68P81066E80-0 entitled "Trunked Syntor X Smartnet/Dual Operation FM Two-way Radio", which is hereby incorporated by reference and obtainable from the Service Publication Department of Motorola, Inc., 1301 East Algonquin Road, Schaumburg, Ill. 60196. However, as previously mentioned, the present invention contemplates the removal of the code plug from the radio and substitutes therefore a reprogrammable non-volatile storage device. In the preferred embodiment, the storage device is an electronically erasable programmable read-only memory (EEPROM). The EEPROM provides protection against loss of the ID code if, for example, power should be cut off from the radio, while allowing reprogramming on a dynamic basis.

To reprogram one or more subscriber units, an operator would access the central 102 through a reprogramming station 108. Basically, the programming station contains "tables" (typically stored in memory devices) of each of the subscriber unit's ID code, including group and subgroup information. Thus, the reprogramming station may be any computing type device that is capable of executing a sequence of steps, and having sufficient memory to store the ID codes of all the subscribers in a particular trunking system. In the preferred embodiment, the reprogramming station 108 is comprised of a computer such as any of the personal computers offered by IBM, Apple, or other manufacturers. The computing device of the reprogramming station 108 communicates with the central 102 either through the control channel, using any digital transceiver well known in the art to transceive, or the reprogramming station may be tied directly into the central 102 via a data bus 112 provided it resides locally, or alternately, can be coupled remotely using data modems and phone lines.

The control channel is simply one of the selected plurality of trunk repeaters which is selected to operate solely to transmit OSWs and receive ISWs to and from the several subscribing units. A repeater suitable for use in the trunking system of FIG. 1 is shown and described in Motorola Instruction Manual 68P81038E85 entitled "Trunked Repeater" which is hereby incorporated by reference and obtainable from the Service Publications Department of Motorola, Inc., 1301 E. Algonquin Road, Schaumburg, Ill. 60196. Typically, any of the several trunk repeaters 104 may operate as the control channel and in many systems, the control channel is periodically changed as a control measure.

All the trunked repeaters 104 communicate with the central 102 via a data bus 110. Thus, the central controller 102 is the heart of the trunked system and controls all channel allocations and monitors call activity. A central controller suitable for use in the present invention is shown and described in detail in Motorola Instruction Manual 68P81066E60-0 entitled "Trunked Radio System Central Controller" which is hereby incorporated by reference and available from the Service Publications Department of Motorola, Inc., 1301 East Algonquin Road, Schaumburg, Ill., 60196.

DYNAMIC REPROGRAMMING

According to the present invention, a dispatcher may decide to reprogram one or all of his radios. Likewise, any other dispatcher could potentially choose to utilize the dynamic reprogramming feature at the same time. In order to limit the impact of these simultaneous ISWs on the system, a mechanism is required to limit the simultaneous use of the feature by different dispatchers.

Thus, the present invention requires an authorized reprogramming station to open a "gateway" through the central controller 102 for the relaying of dynamic reprogramming commands. This requires that each and every reprogramming station in the system have a unique ID, as is required for each and every subscriber unit in the system. The gateway request ISWs contains the ID of the requesting reprogramming station, which may be checked by the central controller to verify that the station is authorized.

Upon receiving the station's ISW, the central checks to see if the reprogramming station is authorized to dynamically reprogram subscriber units. If not authorized, a "request denied" OSW is returned. If authorized, but the gateway is already open for another dynamic reprogramming control location, the requesting station is given a "gateway busy" OSW, indicating that it must try again later when the gateway becomes available. If the gateway is available, the requesting reprogramming station is sent a "gateway grant" OSW.

Once the reprogramming station has opened the gateway, the commands transmitted by the reprogramming station (while the gateway remains open) will be interpreted by the central 102. The subsequent commands do not contain the ID of the originating reprogramming station, instead they contain the ID of the target subscriber unit, and the reprogramming instructions for that unit. If the reprogramming instructions are invalid, or in error, the central 102 will respond by transmitting a "request denied" OSW. If the reprogramming instructions are valid, the central 102 will repeat the reprogramming instructions as OSWs to the target subscriber.

Assuming the reprogramming instructions were valid, and were transmitted as OSWs to a target subscriber, the target subscriber may or may not receive the instructions. Of course, the target unit would not receive the instructions if it was powered off, or was currently involved in a conversation since, in that case, it would be on an assigned voice channel, rather than listening to the control channel.

If the target unit was listening on the control channel and received the reprogramming instructions, it will act, according to the nature of the instructions. All reprogramming instructions received by a subscriber unit will be remembered indefinitely by the subscriber unit since the received instructions are written into reprogrammable non-volatile storage. After storage is complete, the subscriber unit will transmit an acknowledgement ISW. These are subject to the gateway being open and the central controller's test for validity. If these conditions are met the ACK ISW will be re-transmitted by the central as an OSW to the reprogramming station.

After transmitting th original reprogramming instruction ISW, and receiving the reprogramming instruction OSW (broadcast from the central), the reprogramming station 108 awaits an acknowledgement from the target subscriber. When an acknowledgement OSW from the target radio is received, the reprogramming station knows that the reprogramming was successful.

Referring now to FIG. 2 a-b there is illustrated the signalling required to reprogram a subscriber unit. In FIG. 2a the central 102, having received valid ID codes from an authorized reprogramming station 108, communicates a first OSW containing the subscriber unit's permanent ID with the multiword command code as illustrated by communication 202. Following this, a second OSW will be transmitted from the central 102 to the subscriber 106 as illustrated by communication 204. The second OSW 204 contains the reprogramming data that may include, but is not limited to, a new ID code, a new fail-soft channel assignment, cancellation orders of previously reprogrammed ID or fail-soft assignments, or enabling or disabling a subscriber unit's selection capability. The subscriber unit acknowledges reprogramming with dualword ACK ISW 206 and 208 as seen in FIG. 2b.

Referring now to FIG. 3a, there is shown a flow diagram of the steps executed by the reprogramming station 108. The routine begins in decision 302 where the reprogramming station waits until there are subscriber units to be reprogrammed. When there are units to be reprogrammed, the routine proceeds to decision 304 where it waits for the gateway to become available. When the gateway is no longer busy, the routine proceeds to item 306 where the reprogramming station requests the gateway. Decision 308 checks the response from the central. If the gateway becomes busy, having been granted first to another requesting station, the routine returns to decision 304 to await the gateway. If the gateway request is denied, due to the reprogramming station not being authorized, the routine proceeds to item 310 where program execution terminates. If the gateway is granted, program execution continues with the next step, item 312.

In item 312, the reprogramming station forwards the ISW for the first subscriber unit to be reprogrammed and proceeds to decision 314. In decision 314, the reprogramming station awaits the central to respond to the just transmitted ISW. If the command is rebroadcast by the central as an OSW, the reprogramming station returns to item 312 where it may transmit other ISW's or retransmit ISWs that were not acknowledged. If an acknowledgement is received from a subscriber unit in decision 314 to any command which was sent in item 312, the ACK is recorded in item 316. Decision 318 tests whether all the subscriber units have acknowledged reprogramming. If not, the routine returns to item 312 to try again. The reprogramming station may stay in the loop of steps 312, 314, 316 and 318 re-trying commands again and again, until all commands are acknowledged, or until a command is denied due to the gateway being closed by the central. If a command is denied, the routine proceeds to decision 320.

At decision 320, the reprogramming station operator decides to either try again, in which case execution continues at decision 304 to obtain the gateway again. The operator may also decide to try a passive search, which causes execution to go to item 322. In passive search the reprogramming station waits to hear an OSW from one of the units which did not acknowledge its reprogramming command. When an OSW is seen from one of these units, execution automatically switches to decision 304 to begin another search.

If there are no more commands awaiting acknowledgement, execution goes to item 324 where the reprogramming station transmits an ISW relinquishing the gateway, and returns to item 302.

Figure 3B:
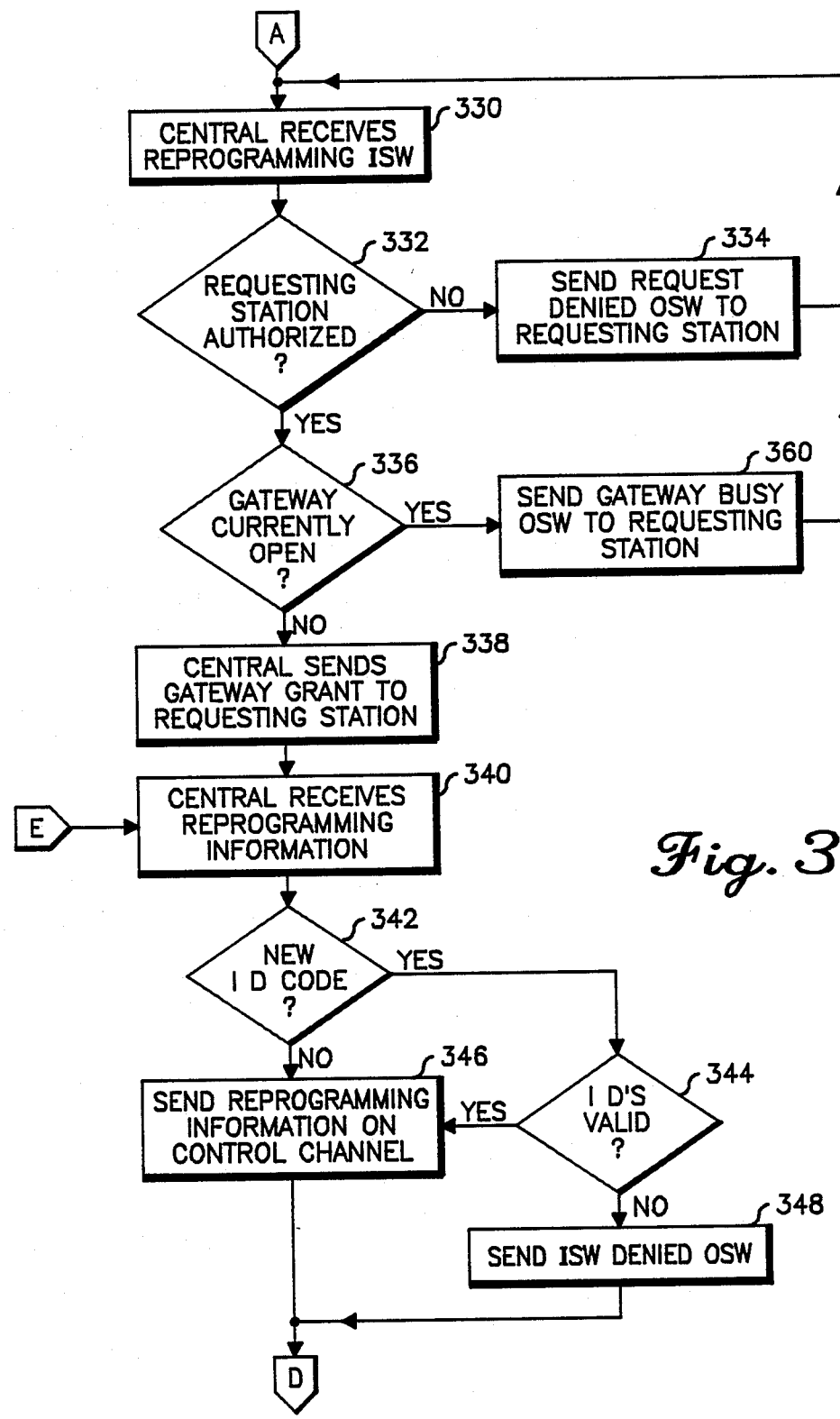
Figure 3C:
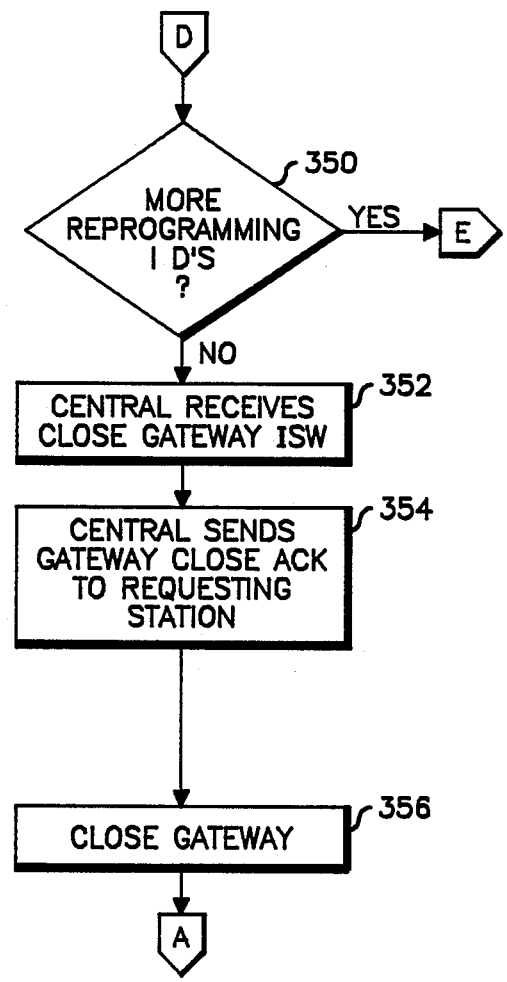

Referring now to FIGS. 3b-c there is shown flow diagrams illustrating the steps executed by the central controller 102 during a reprogramming. According to FIG. 3b, the central 102 begins operation when it receives a gateway request ISW in item 330. The gateway request ISW typically contains the requesting station's ID code and a gateway request code. The central 102 proceeds to decision 332 where it investigates whether the requesting station is authorized to reprogram subscriber units. If the requesting station is not authorized item 334 is executed by the central denying the gateway request and returning to await the next ISW. If decision 332 determines at the requesting station is authorized, the routine proceeds to decision 336 to check if the gateway is currently open. Assuming that the gateway is not open (and is therefore available) the routine of FIG. 3b proceeds to item 338 where the central sends a "gateway grant" OSW to the requesting station and opens the gateway. The requesting station, in response to the first reprogramming command ISW to the central which is received in item 340. Decision 342 tests whether the reprogramming information consists of a new ID code. If the reprogramming information is a new ID, the routine proceeds to decision 344. The central must investigate whether the ID's are valid in decision 344 to determine, for example, if a unit is being reprogrammed to have an ID not valid on a particular trunked system. Assuming that the ID's are valid, the routine of FIG. 3b proceeds to item 346 where the information is repeated over the control channel as previously illustrated in conjunction with FIG. 2a. If decision 342 determines the reprogramming information is not ID codes, item 346 is executed directly. If decision 344 determines that the ID codes are invalid, item 348 is executed and the routine proceeds to item 350 of FIG. 3c. Referring now to FIG. 3c, the routine continues in decision 350 which determines whether there are more subscriber units to be reprogrammed. If the result of decision 350 is affirmative, the routine proceeds to reference letter E of FIG. 3b, which is item 340. The routine repeats in this "loop" until the result of decision 350 is negative indicating that reprogramming is completed. The routine of FIG. 3c next proceeds to item 352 where it receives the "close gateway" ISW from the reprogramming station 108, which the central acknowledges with an OSW in step 354 and closes the gateway in item 356 thereby concluding communication with the requesting reprogramming station.

Referring again to FIG. 3b, decision 336 interrogates whether the gateway is currently open when a new programming station requests to access the gateway. If the gateway is open, meaning that another reprogramming station currently has control of the gateway, the central 102 proceeds to item 360 which sends a "gateway busy" OSW to the requesting station and returns to await the next ISW.

Figure 4:
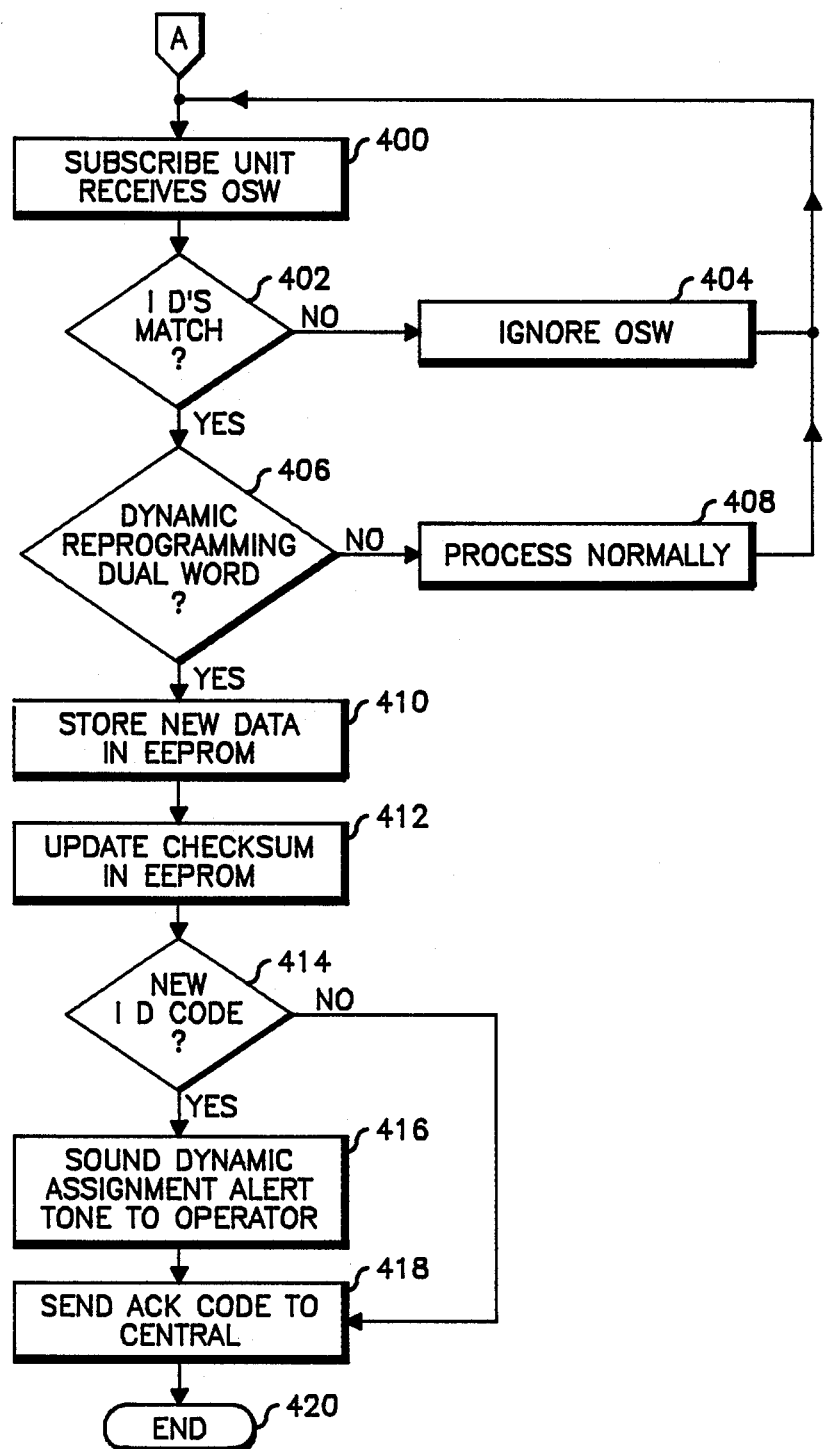
FIG. 4 is a flow diagram illustrating the steps an individual subscriber unit executes to effectuate reprogramming.

Referring now to FIG. 4, there is shown a flow diagram of the steps executed by the subscriber units 106 during a dynamic reprogramming operation. The routine begins in item 400 where the subscriber unit receives the first reprogramming OSW illustrated as communication 202 of FIG. 2a. The subscriber unit first checks to see if the ID of communication 202 matches the code plug ID, or the dynamic ID (if one is current) in decision 402. If the ID's do not match, the subscriber unit ignores the OSW in item 404 and returns to the beginning of the routine to await the next OSW. If, however, the IDs match, decision 406 determines if the second word (204 in FIG. 2a) following the ID is a dynamic reprogramming code. If it is not a dynamic reprogramming code it will process the OSW normally in item 408. Assuming however that the decision 406 determines that a dynamic reprogramming code was received the routine proceeds to item 410.

All dynamic reprogramming instructions are executed by interpreting the information in the second word, and storing new information into appropriate locations in the EEPROM. This accomplishes assigning new dynamic IDs, clearing dynamic IDs, assigning new dynamic fail-soft, clearing dynamic fail-soft, or setting the selection capability of the unit to enable or disable.

The routine of FIG. 4 next proceeds to item 412 where the subscriber unit updates the checksum of the information contained in the EEPROM. The subscriber unit now checks if the reprogramming command assigned a new dynamic ID. If it did, it proceeds to item 416 where an alert tone is sounded to indicate to the operator that his unit has just been dynamically reprogrammed. Optionally a visual indicator can be used either independently or in conjunction with the audio alert tone of item 416. The subscriber unit 106, in item 418, sends an acknowledge ISW (as shown in FIG. 2b) to the central 102 using the same ID code as that of communication 202 of FIG. 2a. Item 420 ends the reprogramming routine and the subscriber operates then normally in the new group.

If the subscriber unit had group, selection capability, and the selection capability was mechanical rather than an electronic display, then the subscriber unit will repeat the alert tone made in item 416 upon each attempt to transmit to ensure that the user knows that his radio is in a dynamic group, rather than the one indicated by the mechanical selector switch. The alerts will be halted after the user manually switches the selectors to the dynamic position. After that time the user may re-select any group which his radio is capable of. If the subscriber unit has had its selection capability disabled by the appropriate dynamic reprogramming command, then any attempt to transmit will always use the dynamic group, and when the radio's mechanical selector is not pointing to the dynamic group the alert tone made in item 416 will be repeated. If the subscriber unit has its selection capability enabled, then it may respond to any individually addressed voice call to either the radio's code plug, or current dynamic ID. Thus the user may still be reached by private calls, or phone calls. If the subscriber unit has had its selection capability disabled, and there is a current dynamic ID, then the radio will no longer respond to individually addressed voice calls to the radio's code plug ID. This ensures that the radio will always participate in group calls within the dynamic group.

In the use of the present invention, subscriber units without selection capability, or reprogrammed to disable selection capability, may end up reprogrammed to a new group without any ability to reach their original dispatcher. This assumes that the original dispatcher may not have been reprogrammed to the new group. This would be the case when a dispatcher normally responsible for a large group of radios has a subset of those radios reprogrammed to another group, while itself remaining in the original group with the rest of the radios which were also not reprogrammed. Regardless of the circumstances, the present invention provides a means of a reprogrammed radio sending a message back to the subscriber unit's original dispatcher to convey the meaning that the radio operator wishes to be reprogrammed. This would presumably be used by a subscriber who could no longer talk to its dispatcher due to being reprogrammed, to indicate that the condition, which caused the dispatcher to originally reprogram them, was over. Having received a reprogram request from a subscriber unit, it is up to the dispatcher to initiate another reprogramming to the subscriber unit to either cancel the previous reprogramming, or issue a new reprogramming to take the place of the previous reprogramming.

This feature is performed by the subscriber initiating the reprogram request function. On subscriber units with mechanical control heads this might be accomplished by depressing a button labeled "Reprogram Request". On a keypad/display control head, it may be accomplished by entering the appropriate sequence of keys. In either event, the subscriber issues a reprogram request ISW containing the subscriber's code plug ID. This ISW is rebroadcast by the central as a reprogram request OSW. The reprogram request OSW can be "heard" by all the reprogramming stations in the system. The reprogramming station which recognizes the code plug ID (since reprogramming stations contain tables of IDs for subscriber units they are capable of reprogramming) will send an acknowledgement ISW. The subscriber unit will hear the OSW rebroadcast of the acknowledgement ISW, and indicate to the radio user that the reprogram request has been received. Once acknowledged by the reprogramming station, the dispatcher is alerted by audible beeps, and a visual display of the subscriber unit which made the reprogram request. Reaction to the request is left to the discretion of the dispatcher.

GROUP DYNAMIC REGROUPING

The present invention contemplates a second method for dynamically regrouping subscriber units on a group basis. Two or more groups may be combined to form a super group which may communicate on a single communication channel.

Individual dynamic reprogramming (described hereinabove) could be used to accomplish the group regrouping function. In this approach, each subscriber unit of the selected groups would be addressed and reprogrammed to the new super group individually. In practice, however, this has been found to be impractical due to the time required to reprogram entire groups and the amount of reprogramming station memory required to handle the new super group. Typically, individual reprogramming can be effectuated at only a few subscriber units per second. Thus, to combine two or more groups, which may contain hundreds of subscriber units, may take several minutes to accomplish. Also, since most trunking systems assign ID codes to groups in blocks, there may not be a continuous block large enough to form the super group. Further, since the individual units now have a completely new identity stored in the EEPROM, the reprogramming station must have sufficient memory to keep track of all the new identities in the super group, and potentially, which groups the subscriber units originally came from if it is desired to return the system to its original state after an emergency. Therefore, the present invention contemplates group regrouping done dynamically without permanently altering the identity code in the subscriber unit.

The reprogramming station 108 sends a regrouping code which is stored in the working memory of the subscriber units (typically dynamic random access memory DRAM) and a pointer (or flag) is set to change the "current ID code" from the EEPROM code to the dynamic code. To remain in a super group the subscriber unit must either "see" (monitor) communication activity within the new super group or periodically receive the dynamic regrouping code. Failure to receive another dynamic regrouping code (every ten seconds in the preferred embodiment) will cause the current ID code pointer to revert to the previous ID code, automatically re-establishing the previous group allocations. In this way super groups can be rapidly created, maintained as long as they are needed, and then have the original configuration easily restored.

All subscriber units which are Group Dynamic Regrouped will make group call requests for their assigned super group in a PTT-ID mode, independent of the actual subscriber unit's normal PTT-ID mode of operation. As used herein, PTT-ID mode means that the radio will identify its ID on the control channel every time the operator depresses the push-to-talk button to begin transmitting. Both the initial call requests prior to voice channel assignment, and subsequent voice channel PTT activity, will utilize a PTT-ID format for unit identification. Units on the voice channel will now process the PTT activity by leaving the voice channel, synchronizing to the control channel again, and sending ISWs to specify this unit's request to transmit on the call currently assigned.

The format of the group call activity for the super group is a dual word request to the central. The first word specifies the current active (code plug or dynamic) ID for this unit. The second word specifies the super group to which this unit is currently assigned. The unit will be directed to the voice channel only after it received a valid dual word OSW from the central, which has the currently active requestor ID as the first word, and the super group identity as the second word. The handshake information on the voice channel is derived from the supergroup identity information, and is independent of the actual requestor individual trunking identity. The use of this dual word format allows the unique identification of the transmitting unit within the super group, without the need of allocating sufficient trunking identity space in the super group to accommodate all the units which have been regrouped to the super group.

Figure 5:
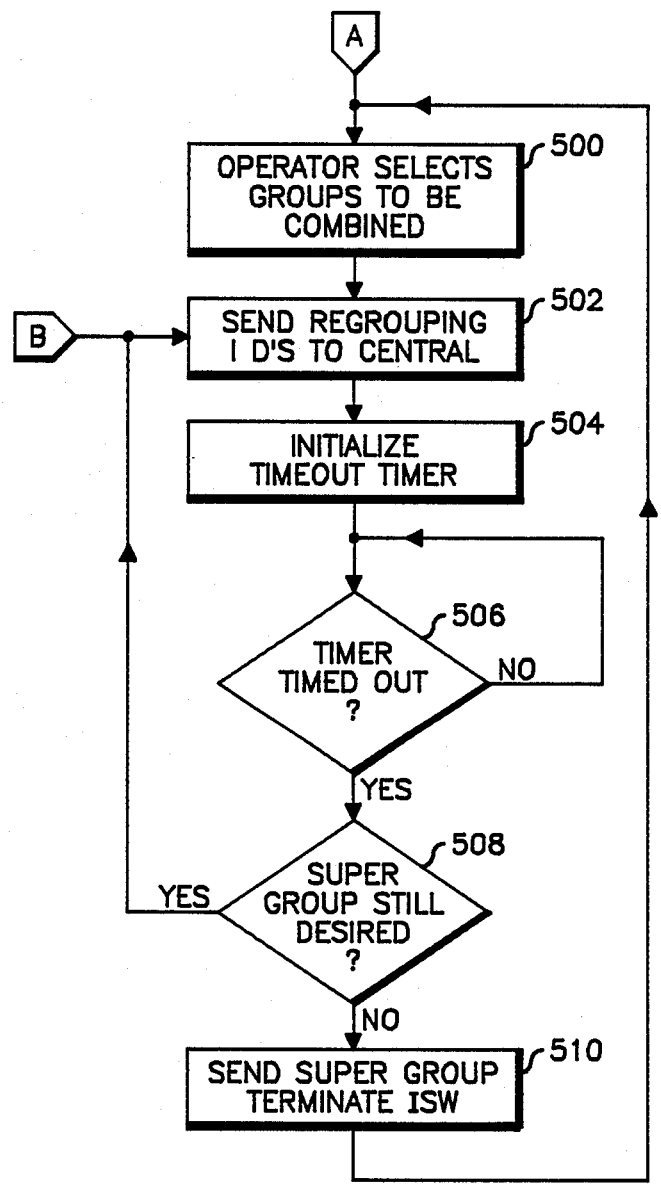
FIG. 5 is a flow diagram illustrating the steps followed by the reprogramming station of FIG. 1 to execute a dynamic regrouping command.

Referring now to FIG. 5, there is shown a flow diagram illustrating the steps executed by the reprogramming station to achieve a group dynamic regrouping. Since group dynamic regrouping is done in mass (i.e., not individual subscribers), the gateway concept is not required. The central simply verifies valid ID codes and repeats the regrouping commands received from the reprogramming station. As illustrated in FIG. 5, the routine begins with item 500 where the operator selects the groups required for dynamic regrouping. This could be a plurality of police and fire departments or other public service companies responding to an emergency. The programming station, in item 502, sends the group ID codes that are to be regrouped into a super group to the central via ISWs. Next, item 504 where the reprogramming station initializes a time out timer to retransmit the regrouping codes after the timer expires. Thus, it is the responsibility of the reprogramming station to keep the super group together and the central merely verifies proper ID codes and repeats the requests on the control channel. The routine next proceeds to decision 506 to determine whether or not the timer has timed out. If the timer is still running, the routine loops in decision 506 until the timer times out, in which case it exits the loop to decision 508. In decision 508 the timer has timed out and the reprogramming station must determine whether or not to maintain the super group. If the super group is no longer required, the routine proceeds to item 510 where the reprogramming station send a terminate ISW to disband the super group. If decision 508 determines that the super group is still required, the routine proceeds to reference letter B of FIG. 5 where the requesting station again sends the regrouping ID codes to the central. The routine of FIG. 5 will continue so long as the super group activity is required.

Figure 6A:
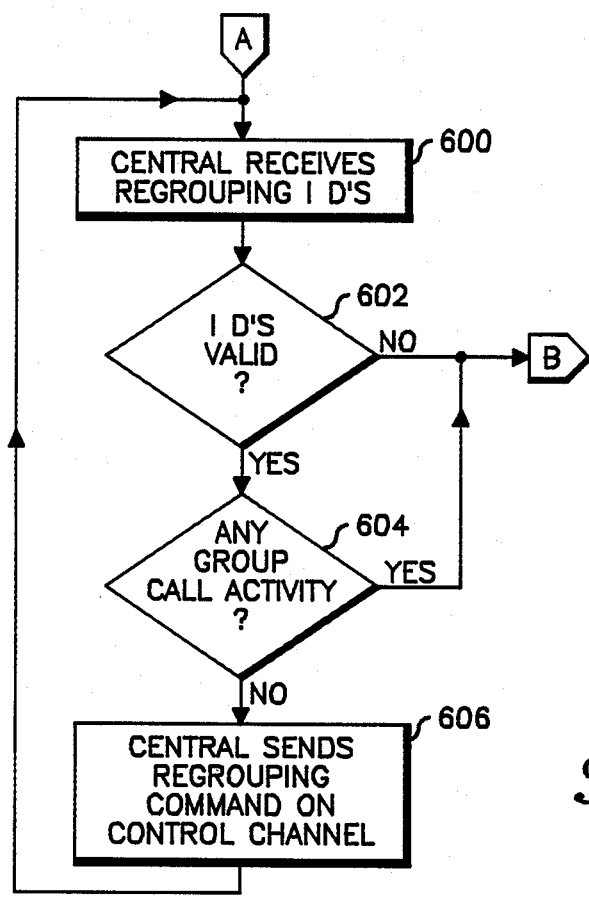
FIG. 6. a-b are flow diagrams illustrating the steps followed by the central controller of FIG. 1 to execute a group dynamic regrouping command.
Figure 6B:
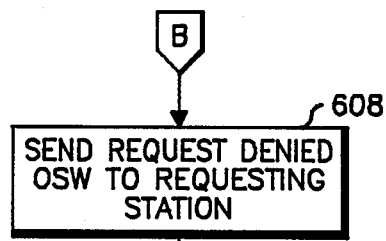

Referring now to FIG. 6a-b, there is shown a flow diagram illustrating the steps executed by the central during a group dynamic regrouping operation. The routine begins in item 600 where the central receives the group ID codes from the requesting reprogramming station. The central checks, in decision 602, whether the IDs are currently valid. Assuming that they are valid the routine proceeds to decision 604. Decision 604 determines whether or not there is a current group call in any of the groups to be reprogrammed. If there is a group call activity the group cannot be regrouped because none of the subscriber units within the group would be monitoring the control channel. However, if one or more individual calls were being executed, the regrouping would be executed thereby regrouping all but, for example, one subscriber into the super group. When the individual subscriber finished his individual call, he would receive one of the subsequent reprogramming commands that are periodically transmitted by the reprogramming station. This approach recognizes the fact that regrouping is done typically on an emergency basis and having one or more individuals temporarily out of the conversation is more desirable than to prohibit the regrouping request. Further, if a subscriber unit that has not joined the super group makes a channel request via an ISW, the central will ignore the request and automatically triggers another transmission of the regroup command to the subscriber. Once in the super group, the subscriber may again request a channel assignment. Therefore, if there is no group call activity, the central, in step 606, sends the regrouping command on the control channel. Since the EEPROM is not reprogrammed the subscriber units need not acknowledge the regrouping. If for any reason an individual subscriber unit did not receive a regrouping command (for example due to signal loss) it would ultimately receive a subsequent regrouping command thereby joining the super group. The central, having completed its tasks returns to reference letter A until another group dynamic regrouping is required. If in decision 602 or 604 the determination is adverse to continuing with the routine of FIG. 6a, the decision blocks exit to reference letter B as shown in FIG. 6b. In FIG. 6b, the central, in item 608, denies the request to regroup to the requesting programming station and returns to reference letter A to wait for the next inbound signalling word. Thus, the group dynamic regrouping method allows a very rapid restructuring of the subscriber units to respond to whatever condition may be present allowing easy recovery of the system to its original state.

While a particular embodiment of the invention has been described and shown, it should be understood that the invention is not limited thereto since many modifications may be made. In particular, those skilled in the art will appreciate that the present invention is readily adaptable to conventional two-way communication systems. Referring again to FIG. 1, by simply deleting the central 102 and coupling the reprogramming stations 108 directly to the repeaters 104 (which, of course, would operate as fixed communication channels), subscribing units assigned to each communication channel could be reprogrammed or regrouped. It is therefore contemplated to cover by the present application any and all such modifications that may fall within the true spirit and scope of the basic underlying principles disclosed and claimed herein.

What is claimed is:

1. In a two-way communication system, having at least one reprogramming station and a plurality of subscriber units arranged in groups, a method for dynamically regrouping at least two groups into a super group comprising the steps of:
   (a) at the reprogramming station:
      (1) accessing at least two groups of subscriber units;
      (2) transmitting a super group ID code and a regrouping command code;
      (3) repeating step (2), after a predetermined time period;
   (b) at the subscriber unit(s):
      (1) receiving said super group ID code and said regrouping command code;
      (2) storing said super group ID code in a memory means in response to said regrouping command code;
      (3) operating under said super group ID code during super group communication activity;
      (4) returning to a previous ID code, after a predetermined time interval, in the absence of super group communication activity.

2. The method of claim 1, wherein said accessing step comprises the step of transmitting group ID codes to initiate group calls so that the groups respond to said transmitted super group ID code and regrouping command code.

3. The method of claim 1, wherein said storing step comprises the steps of:

(a) addressing a memory location in a temporary storage means;
(b) writing said super group ID code into the addressed memory location;
(c) setting a current ID code pointer to indicate said super group ID code.

4. The method of claim 1, wherein said returning step comprises the step of resetting a current ID code pointer to said previous ID code.

5. The method of claim 1, which further includes the step of transmitting a terminate command to disband the super group.

6. A two-way communication system, having at least one reprogramming station and a plurality of subscriber units arranged in groups, said system being capable of dynamically regrouping at least two groups into a super group, comprising:
(a) at the reprogramming station:
  means for accessing at least two groups of subscriber units;
  means for transmitting a super group ID code and a regrouping command code;
  means for repeating transmission of said super group ID and said regrouping command code after a predetermined time period;
(b) at the subscriber unit(s):
  means for receiving said super group ID code and said regrouping command code;
  means for storing said super group ID code in a memory means in response to said regrouping command code; means for operating under said super group ID code during super group communication activity;
  means for returning to a previous ID code, after a predetermined time interval, in the absence of super group communication activity.

* * * * *